UNITED STATES PATENT OFFICE.

THOMAS H. WRIGHT, OF LOS ANGELES, CALIFORNIA.

PROCESS OF MAKING POTASH ALUM.

1,359,011.   Specification of Letters Patent.   Patented Nov. 16, 1920.

No Drawing.   Application filed May 28, 1919.   Serial No. 300,404.

*To all whom it may concern:*

Be it known that I, THOMAS H. WRIGHT, a citizen of the United States, residing at Los Angeles, in the county of Los Angeles and State of California, have invented new and useful Improvements in Processes of Making Potash Alum, of which the following is a specification.

My invention relates to a process of producing potash alum, $KAl(SO_4)_2.12H_2O$, and other products of commercial value from soluble potassium compounds, derived either from soluble potassium minerals or soluble potassium compounds derived from any other source, by means of crude aluminum sulfate.

It is an object of this invention to provide a simple and inexpensive process of making potash alum by the use of aqueous solutions of re-agents which need not be of chemical purity.

My invention consists in the steps of the process hereinafter described and claimed.

I take water soluble potassium compounds which may be derived from deposits in the semi-arid regions of the western part of the United States, or soluble potassium compounds derived from any other source. For example, a potassium compound mineral found in deposits in San Bernardino county, California, is composed of the following ingredients: magnesium sulfate 60 to 76%, sodium sulfate 6 to 10%, potassium sulfate 8 to 18%, and lesser amounts of sodium chlorid, silica, calcium sulfate, etc.

The aluminum sulfate I use in my process is a crude material. I use aluminum sulfate derived from large deposits in the counties of Kern and San Bernardino, State of California, the chemical analysis of which shows approximately 75% of aluminum sulfate, $Al_2(SO_4)_3$, and an insoluble residue of 25%.

The crude potassium compound obtained from San Bernardino county is treated with water, preferably heated, to dissolve the soluble constituents, which, as stated, consist of magnesium, sodium and potassium sulfates. The solution is decanted from the insoluble residue and subjected to fractional crystallization in order to remove practically all the magnesium and sodium sulfates, leaving the mother liquor containing all the potassium sulfate mixed with about 5% of magnesium sulfate and from 1% to 2% of sodium sulfate. This mother liquor is now treated with a solution of aluminum sulfate, the amount of aluminum sulfate to potassium sulfate being taken in molecular proportion.

The re-action is carried on at a temperature not exceeding 92° C. and the preferred density of the solutions is 25° to 30° Bé. for the mother liquor and 40° Bé. for the aluminum sulfate.

Potash alum is produced in accordance with the following equation:

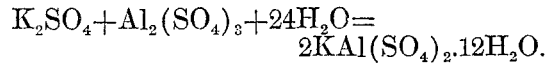
$$K_2SO_4 + Al_2(SO_4)_3 + 24H_2O = 2KAl(SO_4)_2.12H_2O.$$

The solution, on cooling, produces crystals of practically pure potash alum, which are removed from the mother liquor in any suitable way. The remaining mother liquor may be thrown away or used again to treat another quantity of crude potassium material.

My method of treatment varies according to the nature of the acid radical of the potassium salt. For example, I may have potassium chlorid mixed with sodium chlorid in the potassium liquor to be treated and I have discovered that the addition of magnesium sulfate or of sodium sulfate, or a mixture of the two in connection with the aluminum sulfate, produces a perfect re-action, enabling the potash alum to crystallize out in a pure state, as expressed by the following equation:

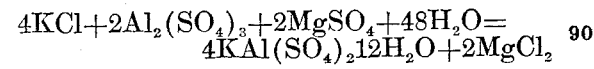
$$4KCl + 2Al_2(SO_4)_3 + 2MgSO_4 + 48H_2O = 4KAl(SO_4)_2.12H_2O + 2MgCl_2$$

or:

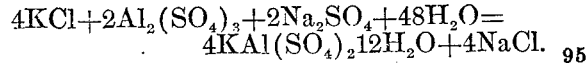
$$4KCl + 2Al_2(SO_4)_3 + 2Na_2SO_4 + 48H_2O = 4KAl(SO_4)_2.12H_2O + 4NaCl.$$

It should be noted that the sulfuric acid radical supplied to the potash alum is also derived from the magnesium sulfate or the sodium sulfate, or a mixture of the two.

It is necessary that the mixture be neutral or slightly acid, and it is therefore advisable to add a small quantity of sulfuric acid until the mixture re-acts slightly acid. In a case where the potassium salt solution contains potassium carbonate sulfuric acid is added until the generation of carbonic acid gas ceases in accordance with the following equation:

$$K_2CO_3 + Al_2(SO_4)_3 + H_2SO_4 = 2KAl(SO_4)_2 + CO_2 + H_2O.$$

In place of making an aqueous solution of the potassium compounds and the aluminum sulfate and magnesium and sodium sulfates respectively, and then mixing them together, the dry salts may be used and thoroughly mixed together. Water is then added to produce the proper degree of density and the mixture is heated to a temperature not to exceed 92° C. It is then cooled and the potash alum crystals are formed. The latter are then filtered from the liquid in any desired manner.

Various changes may be made without departing from the spirit of my invention as claimed:

I claim:

1. A process of making potash alum, comprising treating an aqueous potassium chlorid solution with magnesium, adding a solution of aluminum sulfate, thus producing potash alum, and removing the potash alum thus formed from the mixture.

2. A process of making potash alum, comprising mixing potassium chlorid with magnesium, adding aluminum sulfate, forming an aqueous solution not to exceed a density of approximately 40° Bé., heating the mixture to a temperature not to exceed 92° C., thereby forming potash alum, cooling the mixture, thereby forming crystals of potash alum, and removing them from the mixture.

In testimony whereof I have signed my name to this specification.

THOMAS H. WRIGHT.

It is hereby certified that in Letters Patent No. 1,359,011, granted November 16, 1920, upon the application of Thomas H. Wright, of Los Angeles, California, for an improvement in "Processes of Making Potash Alum," errors appear in the printed specification requiring correction as follows: Page 2, claims 1–2, lines 18, 23–24, after the word "magnesium" insert the word *sulfate;* and that the said Letters Patent should be read with these corrections therein that the same may conform to the record of the case in the Patent Office.

Signed and sealed this 4th day of January, A. D., 1921.

[SEAL.]

L. B. MANN,
*Acting Commissioner of Patents.*

Cl. 23—13.